Sept. 12, 1939.  L. MAGYAR  2,172,940
MACHINE GEAR SHIFTING MEANS FOR MACHINE TOOLS
Filed May 22, 1939  2 Sheets-Sheet 1
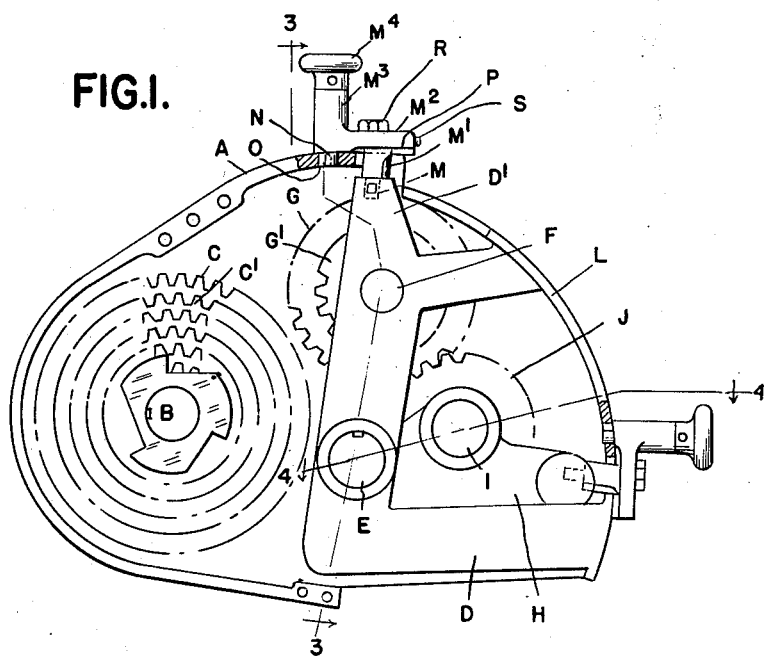
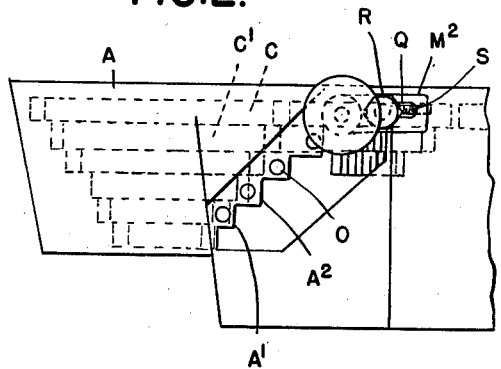
*INVENTOR.*
LOUIS MAGYAR
BY Whittemore Hulbert & Belknap
*ATTORNEYS*

Sept. 12, 1939.   L. MAGYAR   2,172,940

MACHINE GEAR SHIFTING MEANS FOR MACHINE TOOLS

Filed May 22, 1939   2 Sheets-Sheet 2

INVENTOR.
LOUIS MAGYAR
BY
ATTORNEYS

Patented Sept. 12, 1939

2,172,940

UNITED STATES PATENT OFFICE 2,172,940

MACHINE GEAR SHIFTING MEANS FOR MACHINE TOOLS

Louis Magyar, Ecorse, Mich., assignor to Modern Collet & Machine Company, Ecorse, Mich., a corporation of Michigan Application May 22, 1939, Serial No. 275,095

5 Claims. (Cl. 74—397)

The invention relates to change gears shifting means for machine tools and more particularly to that type in which the gear carrier is operated by a handle extending outside of the casing in which the gears are housed. This handle is movable along a stepped guideway and is alternatively locked in engagement with the different steps to hold selected gears in intermeshing engagement. Constructions of this type have been standardized for use on certain makes of machine tools and form a means for quickly effecting the desired gear changes. The handle not only forms a means for moving the gear carrier, but is further provided with a spring bolt for engaging with recesses in the casing adjacent to the various steps so as to hold the intermeshed gears from disengagement.

A serious defect in the construction above described is that the locking means for holding the intermeshed gears in full engagement is subject to wear and distortion. Thus, it has been found that in time the gears are not held fully intermeshed, which results in wear and breakage of the gears, as well as inaccuracy in the performance of work. The wear usually occurs in the sockets or keepers engaged by the spring bolt, and as these sockets are enlarged there is a progressively increasing amount of clearance, permitting the gears to move out of full engagement. Also, distortion of the parts may cause the same result.

It is the primary object of the instant invention to provide means for compensating for this wear or distortion, so that at all times the gears when shifted by the handle, will be placed in full mesh with the cooperating gears and will be locked in this position during the operation of the machine. To this end the invention consists in the construction of a gear shifter provided with such compensating means, and further in the specific construction of such means as hereinafter set forth.

In the drawings:

Figure 1 is a side elevation of a change gear construction for machine tools provided with my improved shifting and locking means;

Figure 2 is a plan view thereof;

Figure 4:
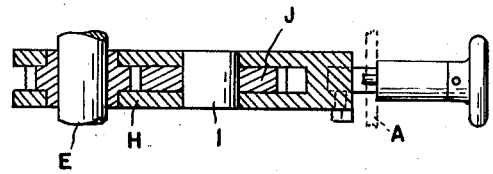
Figure 4 is a cross section on line 4—4 of Figure 1.
Figure 3:
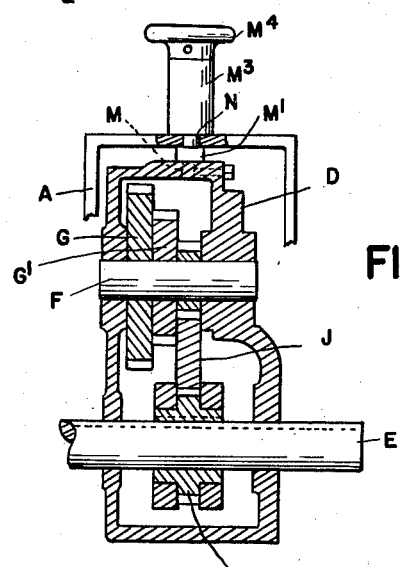
Figure 3 is a cross section on line 3—3 of Figure 1.
Figure 5:
Figure 5 is an enlarged view of the shifter and locking handle.

As illustrated, A is the housing for the change gears. B is a shaft extending into said housing having mounted thereon a series of gears C, C′, etc. D is a gear carrier pivotally supported on a shaft E and carrying a shaft F having a series of gears G, G′, etc., revoluble thereon. A second gear carrier H is also pivoted upon the shaft E and has journaled therein a shaft I having a gear J journaled thereon. The carriers D and H are not only pivoted on the shaft E, but are also movable axially thereon, so that any selected gear of the series G, G′, etc., may be intermeshed with any selected gear of the series C, C′, etc. In like manner the gear J on the carrier H which is in constant intermesh with a gear K splined upon the shaft E may be shifted by a movement of said carrier H into alternative engagement with gears of the series G, G′, etc. The carrier D has connected therewith a segment L which forms a part of the housing for the gears. It also has at its free end a portion D′ formed with a socket for attachment of the operating handle thereto. This handle comprises a shank M for engaging the socket in the portion D′, an outwardly extending portion M′, a laterally extending portion M², an outwardly extending portion M³ and a knob portion M⁴. As usually constructed, the portions M, M′, M² and M³ are integral and the portion M³ is recessed for receiving a bolt N connected to the knob M⁴. There is also a spring N′ surrounding the bolt and within a recess in the portion M³, said spring serving to yieldably project the bolt downward, but permitting of its withdrawal by an upward pull on the knob M⁴. The casing A is formed with a series of steps A′, A², etc., and adjacent to each step is a recess O for receiving the bolt and forming a keeper therefor. As has been previously described, these keepers after a certain amount of use, will become enlarged so that the bolt will no longer hold the carrier in an accurate position, and consequently the selected gears will not be held fully intermeshed.

To avoid the defect just described, my improved construction of operating means has the portions M′ and M² formed of separate members. The portion M² is formed with a guideway P and the portion M′ is slotted to embrace this guideway so as to be adjustable to different positions thereon. The portion M² is also provided with a slot Q therethrough for the passage of a bolt R threadedly engaging a recess in the portion M′ and serving to clamp this portion to said portion M². An adjusting screw S engages a threaded aperture in the end of the portion M² and projects within the slot Q to bear against the bolt R.

Thus, by adjusting this screw S when the bolt R is released from its clamping engagement the distance between the shank M and the bolt N may be varied.

By reason of this change in construction of the shifting handle, it is possible at any time to make an adjustment which will fully compensate for wear in the sockets or keepers O. If, for instance the sockets O are elongated by reason of wear, this with the construction previously used, would permit the bolt N to shift from its correct position, and consequently would allow the intermeshed gears to separate a corresponding amount. However, with my improved construction all that is necessary is to adjust the screw S which shifts the shank M toward the bolt N a distance equal to the amount of wear.

This adjustment means is also useful to compensate for distortion, such for instance as the bending of the shank M which secures the handle to the carrier, or the bending of the bolt N which engages the keeper. It has been found that such distortion does occur with the constructions heretofore used, but with my improved construction any change in dimension between the position of the shank and of the bolt may be corrected by adjustment of the screw S.

What I claim as my invention is:

1. Shifter means for change gears of machine tools comprising a gear carrier, a handle for moving said carrier to engage selected gears, a locking bolt on said carrier, a stationary keeper cooperating with said bolt to hold said selected gears engaged, and means for adjusting said bolt on said carrier to compensate for wear or distortion and to hold said gears fully intermeshed.

2. Shifter means for change gears of machine tools comprising a gear carrier, a handle for moving said carrier to engage selected gears, a locking bolt associated with said handle, a stationary keeper cooperating with said bolt to hold said gears engaged, and means for adjusting said handle and bolt on said carrier to compensate for wear or distortion.

3. Shifter means for change gears of machine tools comprising a gear carrier, a handle for moving said carrier to engage selected gears including a knob and a locking bolt actuated thereby, a stationary keeper cooperating with said bolt to hold said selected gears engaged, and means for laterally adjusting said bolt on said handle to compensate for wear or distortion.

4. Shifter means for change gears of machine tools comprising a gear carrier, a handle for moving said carrier to engage selected gears including a member secured to said carrier, a second member laterally adjustably secured to said first member, a locking bolt and an actuating knob therefor carried by said second member and a stationary keeper for cooperating with said bolt to hold said selected gears intermeshed.

5. Shifter means for change gears of machine tools comprising a carrier for a plurality of gears, a handle for moving said carrier to a plurality of different positions for selectively engaging said gears with cooperating gears, said handle including a member attached to the carrier, a second member laterally slidably engaging said first member, a screw for adjusting the position of said second member with respect to said first member, clamping means for holding said members in adjusted position, a locking bolt carried by said second member provided with an actuating knob and a stationary keeper for holding said carrier alternatively in its several positions of adjustment, said positions being accurately determined by adjustment of said second member with respect to said first member.

LOUIS MAGYAR.